United States Patent
Ewedemi et al.

(10) Patent No.: US 6,809,666 B1
(45) Date of Patent: Oct. 26, 2004

(54) CIRCUIT AND METHOD FOR GRAY CODE TO BINARY CONVERSION

(75) Inventors: Odutola Oluseye Ewedemi, San Jose, CA (US); David Xiao Dong Yang, Mountain View, CA (US); Xi Peng, Milpitas, CA (US)

(73) Assignee: Pixim, Inc., Mountain View, CA (US)

( * ) Notice: Subject to any disclaimer, the term of this patent is extended or adjusted under 35 U.S.C. 154(b) by 898 days.

(21) Appl. No.: 09/639,520

(22) Filed: Aug. 15, 2000

Related U.S. Application Data

(63) Continuation-in-part of application No. 09/567,638, filed on May 9, 2000, and a continuation-in-part of application No. 09/567,786, filed on May 9, 2000.

(51) Int. Cl.[7] .............................................. H03M 7/04
(52) U.S. Cl. ................................................ 341/97
(58) Field of Search ........................... 341/50, 97, 98; 348/294

(56) References Cited

U.S. PATENT DOCUMENTS

| | | | | |
|---|---|---|---|---|
| 4,055,841 A | * | 10/1977 | Crawford | 341/97 |
| 4,975,698 A | * | 12/1990 | Kagey | 341/96 |
| 5,461,425 A | | 10/1995 | Fowler et al. | 348/294 |
| 5,801,657 A | | 9/1998 | Fowler et al. | 341/155 |
| 5,841,126 A | | 11/1998 | Fossum et al. | 250/208.1 |
| 5,912,832 A | * | 6/1999 | Flahie et al. | 708/707 |
| 6,441,829 B1 | * | 8/2002 | Blalock et al. | 345/690 |
| 6,703,950 B2 | * | 3/2004 | Yi | 341/97 |

* cited by examiner

*Primary Examiner*—Peguy Jeanpierre
(74) *Attorney, Agent, or Firm*—Patent Law Group LLP; Carmen C. Cook

(57) ABSTRACT

An image sensor includes a sensor array, a data memory for storing pixel data and a pixel normalization circuit. The sensor array has a two-dimensional array of pixel elements and outputs digital signals as pixel data representing an image of a scene. The pixel data outputted by the sensor array are arranged in a sensor-bit arrangement and the pixel normalization circuit rearranges the pixel data into a pixel-bit order. In another embodiment, an image sensor includes a sensor array, a data memory, and a pixel normalization circuit, all fabricated on a single integrated circuit. The pixel normalization circuit includes one or more of a pixel rearrangement circuit, a Gray code to binary conversion circuit, a reset subtract circuit, and a multiple sampling normalization circuit. Finally, a Gray code to binary conversion circuit is provided for high speed conversion.

10 Claims, 11 Drawing Sheets

| P0B0 | P0B1 | P0B2 | P0B3 | P1B0 | P1B1 | P1B2 | P1B3 | P2B0 | P2B1 | P2B2 | P2B3 |
|------|------|------|------|------|------|------|------|------|------|------|------|
| P3B0 | P3B1 | P3B2 | P3B3 | P4B0 | P4B1 | P4B2 | P4B3 | P5B0 | P5B1 | P5B2 | P5B3 |

• • •

CIRCUIT AND METHOD FOR GRAY CODE TO BINARY CONVERSION

CROSS-REFERENCE TO RELATED APPLICATION

This is a continuation-in-part of two co-pending U.S. applications Ser. No.: 09/567,638 and Ser. No.: 09/567,786 respectively entitled "Integrated Digital Pixel Sensor Having a Sensing Area and a Digital Memory Area," and "Multiple Sampling via a Time-indexed Method to Achieve Wide Dynamic Ranges," all filed on May 9, 2000 and by David Yang, et al., two of which are the co-inventor thereof.

The present application is related to concurrently filed U.S. patent applications Ser. No. 09/638,503 and Ser. No. 09/638,502, respectively entitled "Circuit and Method for Pixel Rearrangement in a Digital Pixel Sensor Readout" and "Implementation of Pixel Normalization in a Digital Pixel Sensor," by Odutola Oluseye Ewedemi et al.

BACKGROUND OF THE INVENTION

1. Field of The Invention

The invention generally relates to image sensor systems; and in particular, the present invention relates to an image sensor utilizing a digital pixel sensor architecture.

2. Background of the Invention

Digital photography is one of the most exciting technologies that have emerged in the past years. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make digital cameras the hottest new category of consumer electronics products.

Digital cameras, however, do not work in the way that traditional film cameras do. In fact, they are more closely related to computer scanners, copiers, or fax machines. Most digital cameras use an image sensor or photosensitive device, such as charged-coupled device (CCD) or Complementary Metal-Oxide Semiconductor (CMOS) to sense a scene. The photosensitive device reacts to light reflected from the scene and can translate the strength of that reaction into electronic charging signals that are further digitized. By passing light through red, green, and blue filters, for example, the reaction can be gauged for each separate color spectrum. When the readings are combined and evaluated via software, the camera can determine the specific color of each segment of the picture. Because the image is actually a collection of numeric data, it can easily be downloaded into a computer and manipulated for more artistic effects.

Digital cameras, however, do not have the resolution attainable with conventional photography. While traditional film-based technology, limited only by the granularity of the chemically based film, typically has a resolution of tens of millions of pixels, image sensors for use in most commercially available digital cameras acceptable to general consumers have a resolution of slightly more than one or two million pixels. Although digital cameras having resolutions of up to six million pixels are available, these high-resolution cameras are prohibitively expensive. Furthermore, the dynamic range of digital image sensors is often not as broad as is capable with film-based conventional photography. This is especially true for CMOS image sensors which, in general, have lower dynamic ranges than CCDs.

U.S. Pat. No. 5,461,425 to B. Fowler et al. describes a CMOS image sensor with pixel level analog-to-digital conversion. Such an image sensor, referred to as a digital pixel sensor (DPS), provides a digital output signal at each pixel element representing the light intensity detected by that pixel element. The combination of a phototransistor and an analog-to-digital (A/D) converter helps enhance detection accuracy and reduce power consumption, and improves overall system performance. Furthermore, U.S. patent application Ser. No. 09/567,638 describes an integrated DPS sensor with an on-chip memory for storing at least a frame of the image data. The incorporation of an on-chip memory alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is recognized as the technique capable of achieving a wide dynamic range without many of the disadvantages associated with other dynamic range enhancement techniques, such as degradation in signal-to-noise ratio and increased implementation complexity. U.S. patent application Ser. No. 09/567,786 describes a method for facilitating image multiple sampling using a time-indexed approach. The aforementioned patent and patent applications are incorporated herein by reference in their entireties.

In the DPS sensor of the '425 patent, the analog-to-digital conversion (ADC) is based on first order sigma delta modulation. While this ADC approach requires fairly simple and robust circuits, it has the disadvantages of producing too much data and suffering from poor low light performance. U.S. Pat. No. 5,801,657, and U.S. patent application Ser. No. 09/274,202 provide alternative ADC mechanisms that can significantly improve the overall system performance while minimizing the size of the A/D converters. The aforementioned patent and patent application are incorporated herein by reference in their entireties.

What is needed is a digital image sensor with integrated supporting circuitry for improving the performance of the image sensor.

SUMMARY OF THE INVENTION

In accordance with one aspect of the present invention, an image sensor includes a sensor array, a data memory and a pixel normalization circuit. The sensor array has a two-dimensional array of pixel elements and outputs digital signals as pixel data representing an image of a scene. The pixel data outputted by the sensor array are arranged in a sensor-bit arrangement. The data memory is in communication with the sensor array and stores the pixel data. The pixel normalization circuit is coupled to the data memory for rearranging the pixel data into a pixel-bit order and providing the rearranged pixel data as output signals.

In accordance with another aspect of the present invention, an image sensor includes a sensor array, a data memory, and a pixel normalization circuit, all fabricated on a single integrated circuit. The sensor array has a two-dimensional array of pixel elements and outputs digital signals as pixel data representing an image of a scene. The data memory is in communication with the sensor array for storing the pixel data. The pixel normalization circuit is coupled to the data memory for normalizing the pixel data and providing normalized pixel data as output signals. In one embodiment, the sensor array outputs the pixel data in a sensor-bit arrangement and the pixel normalization circuit includes a pixel rearrangement circuit for rearranging the pixel data into a pixel-bit arrangement. In another embodiment, the sensor array outputs the pixel data represented in Gray code and the pixel normalization circuit includes a conversion circuit for converting the pixel data into a binary representation. In another embodiment, the data memory stores reset values for each of the pixel elements in the sensor array and the pixel normalization circuit includes a reset subtract circuit for subtracting the reset values from the pixel data for each of the pixel elements. In yet another embodiment, the sensor array uses multiple sampling for establishing a wide dynamic range for the sensor array, and the data memory includes a time index memory for storing the time index value for each of the pixel elements. In another embodiment, the pixel normalization circuit includes a multiple sampling normalization circuit for calculating the normalized pixel data for each of the pixel elements based on the pixel data and the time index values.

According to another aspect of the present invention, a method for constructing an n-bit Gray code to binary conversion circuit is described. A method for converting an n-bit Gray code number to an n-bit binary number includes (1) computing the binary value of the least significant bit (LSB) of the n-bit Gray code number using an XOR tree; the XOR tree including a first set of XOR gates for evaluating the n-bit Gray code number and generating the binary value of the LSB in a shortest gate delay time; (2) determining in the XOR tree a first group of bits, other than the LSB, for which binary values of the first group of bits are also generated; and (3) providing a second set of XOR gates for computing the binary values of a second group of bits of the n-bit Gray code number, other than the first group of bits and the LSB, the second set of XOR gates computing the binary values in a gate delay time less than or equal to the shortest gate delay time of the XOR tree.

According to yet another aspect of the present invention, a method for converting an n-bit Gray code number to an n-bit binary number includes: (1) providing a plurality of building blocks for converting 2-bit, 3-bit, and 4-bit Gray code numbers, each of said building blocks including one or more XOR gates and having the shortest gate delay time for converting a 2-bit, 3-bit or 4-bit Gray code number; (2) selecting a combination of said building blocks for converting said n-bit Gray code number; and (3) providing a first set of XOR gates at output terminals of said building blocks for converting the lower order bits, as necessary, of said n-bit Gray code number. The Gray code to binary conversion circuits according to the present invention provides high speed conversion and conserves circuit area.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

Figure 1:
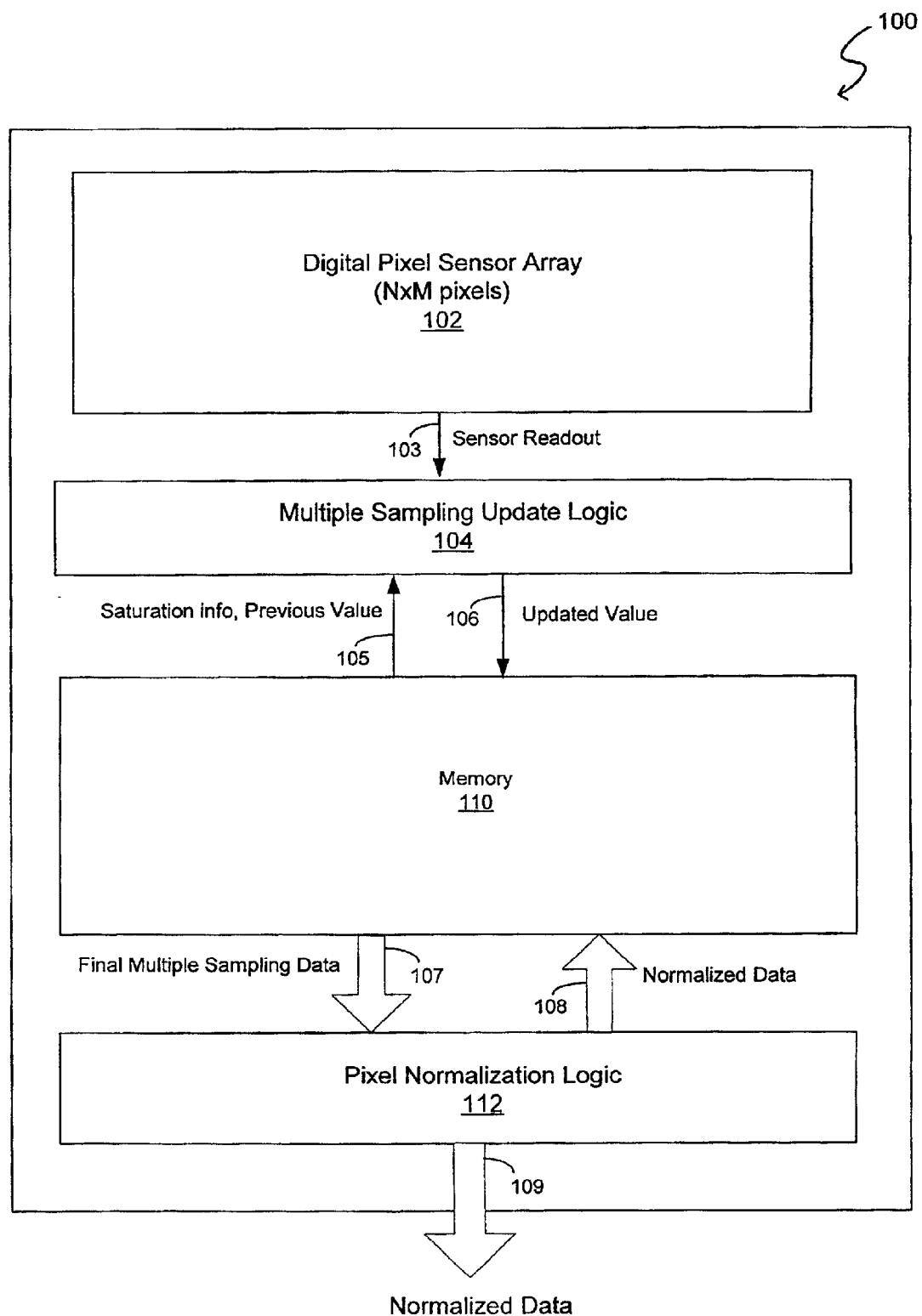
FIG. 1 is a block diagram of an image sensor according to one embodiment of the present invention.

According to the present invention, an image sensor, based on a digital pixel sensor (DPS) architecture, is integrated with a pixel normalization circuit for enhancing the efficiency and the performance of the image sensor. The pixel normalization circuit in the image sensor of the present invention performs one or more of the pixel normalization functions including pixel-bit rearrangement, Gray code to binary conversion, digital correlated double sampling operation, and multiple sampling normalization operation. FIG. 1 illustrates a block diagram of an image sensor according to one embodiment of the present invention. Image sensor 100 may be used in an image capturing device such as a digital camera for capturing stationary or video photography. Image sensor 100 produces digital image data as output signals on bus 109.

The image sensor core of image sensor 100 is implemented as a digital pixel sensor (DPS) array 102. DPS array 102 is a two-dimensional array of light detecting elements, also called photodetectors. In FIG. 1, DPS array 102 is arranged as N rows by M columns of photodetectors and has an image resolution of N×M pixels. For color applications, a mosaic of selectively transmissive filters is superimposed in registration with each of the photodetectors so that a first, second, and third selective group of photodetectors are made to sense three different color ranges, for example, the red, green, and blue ranges of the visible spectrum, respectively. DPS array 102 generates digital signals as sensor readout on output bus 103.

In the present description, a DPS array or a sensor array refers to an image sensor having an array of photodetectors where each photodetector produces a digital output signal. In the present embodiment, DPS array 102 implements the digital pixel sensor architecture described in aforementioned U.S. Pat. No. 5,461,425 (the '425 patent) which utilizes pixel level analog-to-digital conversion. The photodetector of a DPS array are sometimes referred to as a sensor pixel or a sensor element or a digital pixel, which terms are used to indicate that each of the photodetectors of a DPS array includes an analog-to-digital (A/D) conversion circuit, and is distinguishable from a conventional photodetector which includes a photosensor and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Furthermore, in the present embodiment, DPS array 102 utilizes Multi-Channel Bit Serial (MCBS) analog-to-digital conversion as described in aforementioned U.S. Pat. No. 5,801,657. DPS array 102 uses a k-bit MCBS ADC and outputs digital signals represented in Gray code. An MCBS ADC has many advantages applicable to image acquisition and more importantly, facilitates a high-speed readout. Of course, other ADC techniques can be used, such as a first order sigma delta modulation ADC.

Figure 2:
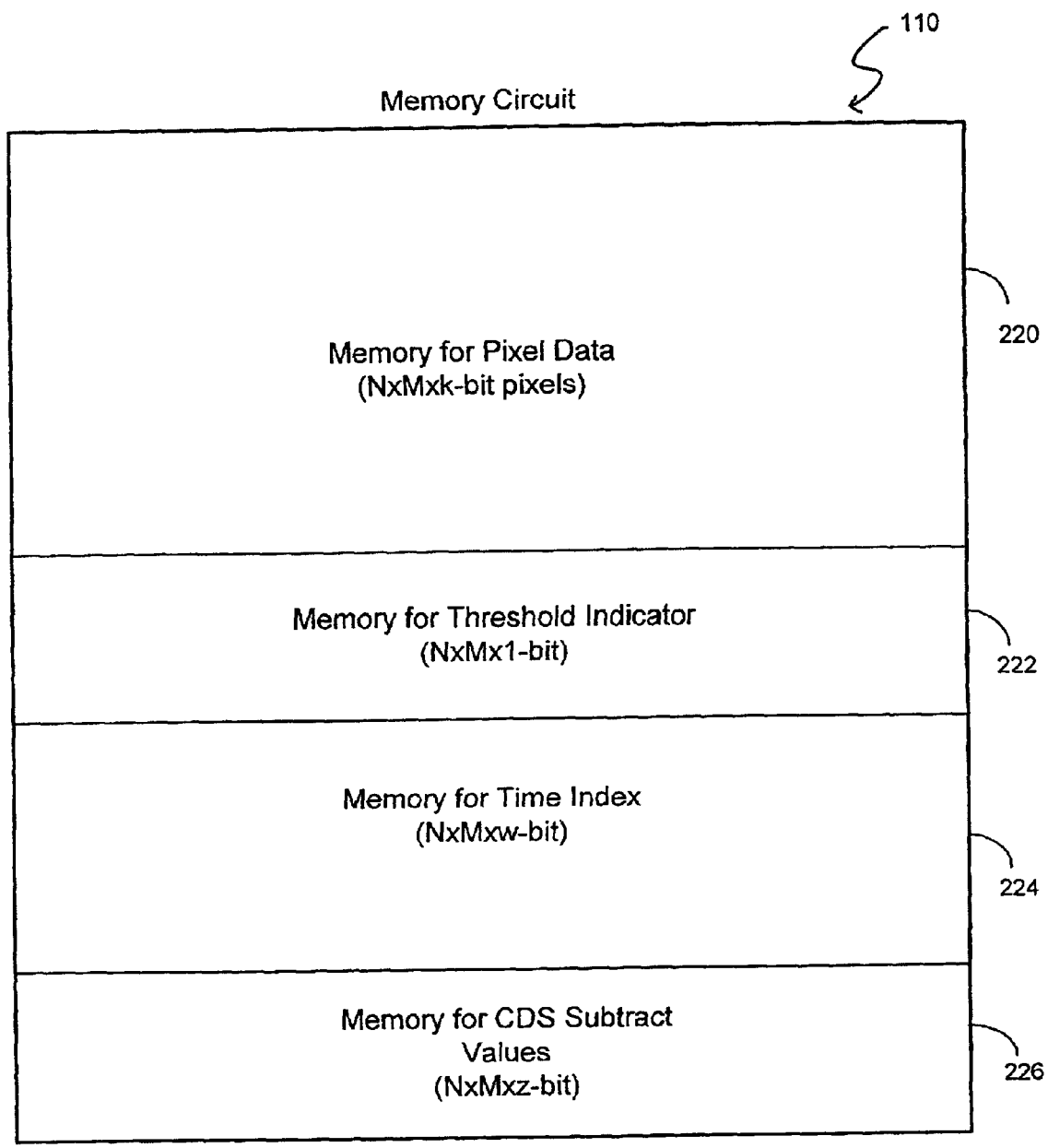
FIG. 2 illustrates the memory configuration of the memory in the image sensor of FIG. 1 according to one embodiment of the present invention.

Image sensor 100 further includes an integrated on-chip memory 110 for storing at least one frame of image data from DPS array 102. Thus, memory 110 has the capacity to store pixel data for at least N by M pixels in k-bits. In the present embodiment, memory 110 also includes additional storage capacity for storing other parameters used by image sensor 100 as will be described in more detail below. In one embodiment, DPS array has 1000 by 1000 pixels in 10 bits and memory 110 has a size of at least 1.2 megabytes to store digital signals from all of the pixel elements in DPS array 102 at the frame rate. As described in aforementioned patent application Ser. No. 09/567,638, integrating an on-chip memory with a digital pixel sensor array solves the problem of data transmission bottleneck and allows fast data readout from the sensor array. FIG. 2 illustrates the memory storage configuration of memory 110 according to one embodiment of the present invention. Memory 110 includes a memory location 220 for storing the k-bit pixel data generated by DPS array 102. Memory 110 also includes memory locations 222 and 224 for storing the threshold indicator and the time index information for each pixel when multiple sampling is used as will be described in more detail below. Furthermore, memory 110 includes a memory location 226 for storing the reset values from each of the pixels in DPS array 102. The reset values are used in a correlated double sampling (CDS) methodology to eliminate non-uniformity in the sensor array as will be described in more detail below. Memory location 226 is included only when image sensor 100 employs the CDS methodology. In other embodiments, when CDS methodology is not used, memory location 226 is not needed.

In operation, an image is focused on DPS array 102 such that a different portion of the focused image impinges on each of the sensor pixels in the array. Each sensor pixel comprises a phototransistor whose conductivity is related to the intensity of light impinging upon the base of the phototransistor. The analog current through the phototransistor thus corresponds to the intensity of light impinging upon the phototransistor. The analog signals from all phototransistors in array 102 are simultaneously converted into serial bit streams by dedicated A/D converters located at each sensor pixel. The serial bit streams, generated over a frame period, is provided on bus 103 as digital output signals representative of the average intensity of light impinging on the phototransistors.

Figure 3:
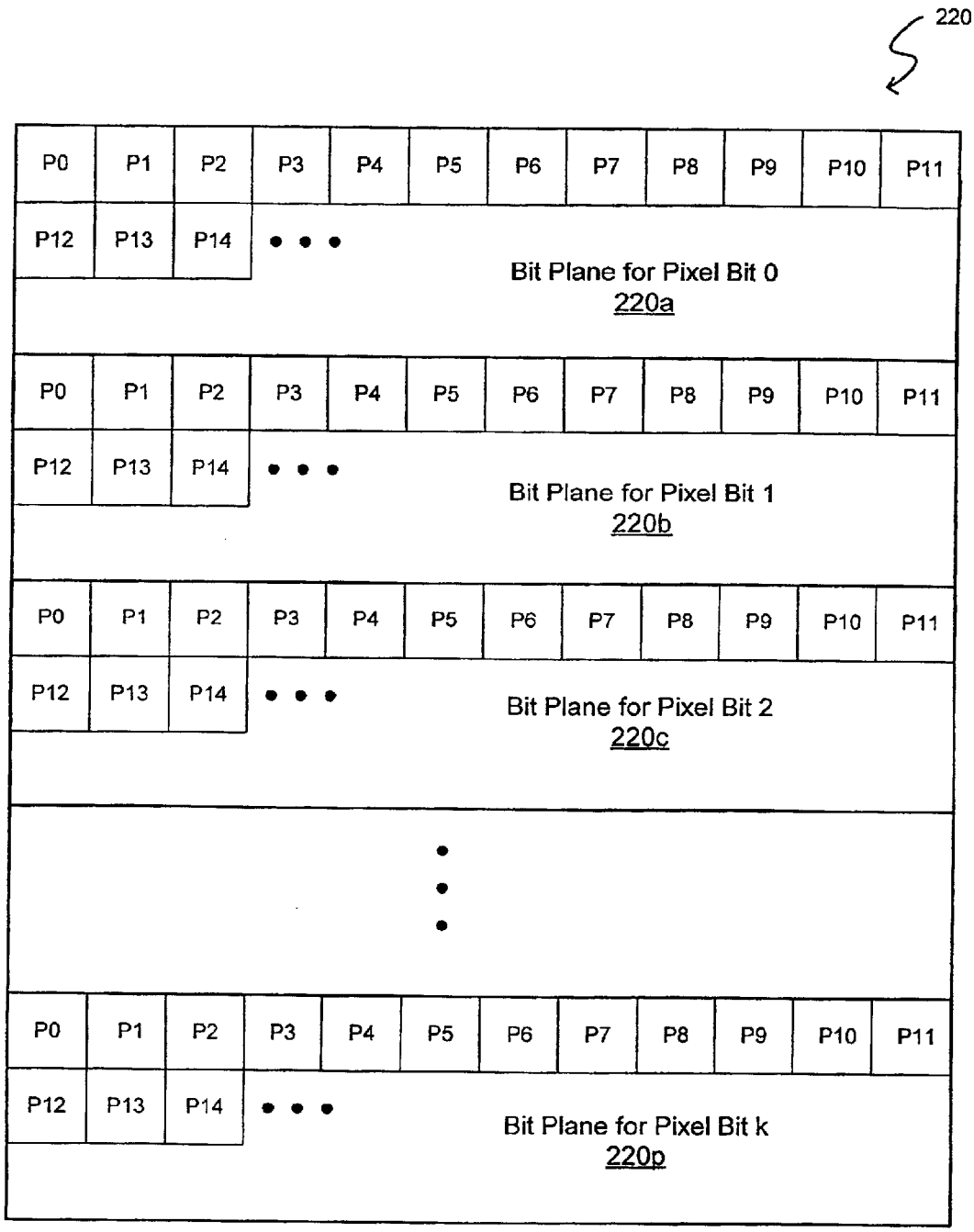
FIG. 3 illustrates the memory configuration of the memory in the image sensor of FIG. 1 where the pixel data are stored in a sensor bit arrangement.

In image sensor 100, sensor readout from DPS array 102 are provided through a multiple sampling update circuit 104 to memory 110 for storage. Multiple sampling update logic circuit 104 is used to implement multiple sampling for improving the dynamic range of image sensor 100 and will be described in more detail below. In the case when multiple sampling is not used, sensor readout from DPS array 102 may be coupled directly to memory 110. DPS array 102 provides sensor readout in the form of bit planes. FIG. 3 illustrates the memory configuration of memory location 220 in memory 110 resulted from storing sensor readout from DPS array 102 directly in memory 110. In DPS array 102, the photodetectors generate one bit of the digital pixel data simultaneously and provide the one bit of digital data as output signals on bus 103. Thus, the first bit of the digital pixel data (i.e. bit 0) for all of the pixels in the sensor array is written in memory 110, forming bit plane 220a for pixel bit 0. The photodetectors then generate the next bit of the k-bit pixel data for each sensor pixel and the next bit plane, containing bit 1 of all the pixels, is written to memory 110 as bit plane 220b for pixel bit 1. The photodetectors of DPS array 102 generate the k bits of digital pixel data successively for each sensor pixel and the data are written to memory 110 as successive bit planes 220a to 220p as illustrated in FIG. 3. Memory location 220 of memory 110 includes storage capacity for storing all of the bit planes for the k-bit digital pixel data.

Figures 4, 5:
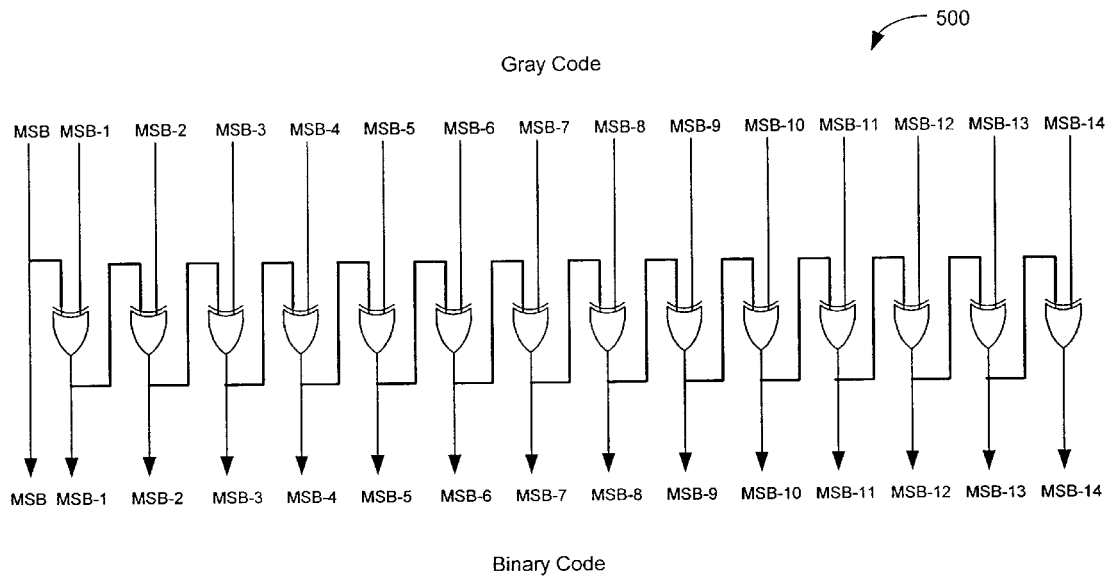
FIG. 4 illustrates the desired pixel bit arrangement for the image sensor of FIG. 1.
FIG. 5 illustrates a circuit diagram for an n-bit Gray code to binary conversion circuit using a straightforward implementation of the recursive XOR equations.

Because DPS array 102 outputs pixel data in a sensor bit arrangement, the pixel data are stored in memory 110 in the form of bit planes. However, the sensor bit arrangement of the pixel data in memory 110 is not useful for applications interfacing with image sensor 100 as the k-bit pixel data for a pixel are scattered throughout memory 110. To provide for a compatible interface with other image processing devices receiving the image captured by image sensor 100, what is needed is for the pixel data to be in a pixel bit arrangement, i.e., all the bits for one pixel to be adjacent to each other. The desired pixel bit arrangement in memory 110 for a 4-bit pixel is illustrated in FIG. 4. The first four bits of memory location 220 stores the 4-bit pixel data of pixel 0, which is followed by the 4-bit pixel data of pixel 1 and pixel 2 and so on. Although FIG. 4 illustrates that pixel 0 to pixel 4 are arranged in sequential order, the pixel order is not important in the pixel bit arrangement. That is, it is not important that adjacent pixels are arranged adjacent to each other. For the pixel bit arrangement, it is only important that all the bits for one pixel are grouped together in a consecutive bit order. The order of the pixels can be arranged in any ways which are desirable for the particular application. Therefore, in one embodiment, in the pixel bit arrangement, all bits of pixel 0 is followed by all bits of pixel 3 which is then followed by all bits of pixel 2. The pixel data stored in memory 110 can be read out by using the proper memory addressing scheme.

In accordance with the present invention, a pixel normalization circuit 112 is provided for performing a pixel rearrangement operation on the pixel data stored in memory 110. Pixel normalization circuit 112 is integrated on the same integrated circuit chip of image sensor 100. The integration of pixel normalization circuit 112 on image sensor 100 improves the speed and performance of image sensor 100. In one embodiment, pixel normalization circuit 112 operates only to rearrange the configuration of the pixel data in memory 110. The rearranged pixel data may be written back to memory 110 so that memory 110 has in storage the desired pixel bit arrangement of an image. In another embodiment, the rearranged pixel data may simply be outputted on bus 109 to other devices coupled to receive the image data from image sensor 100 and the data in memory 110 are not updated in the pixel bit arrangement. In another embodiment of the present invention, besides pixel rearrangement, pixel normalization circuit 112 includes circuits for performing other normalization functions on the pixel data read out from DPS array 102. The normalization functions can include but is not limited to Gray code conversion, CDS subtract, and multiple sampling normalization. In those cases, the normalized pixel data in pixel bit arrangement may be written back to memory 110 for storage or outputted on bus 109.

Figure 8:
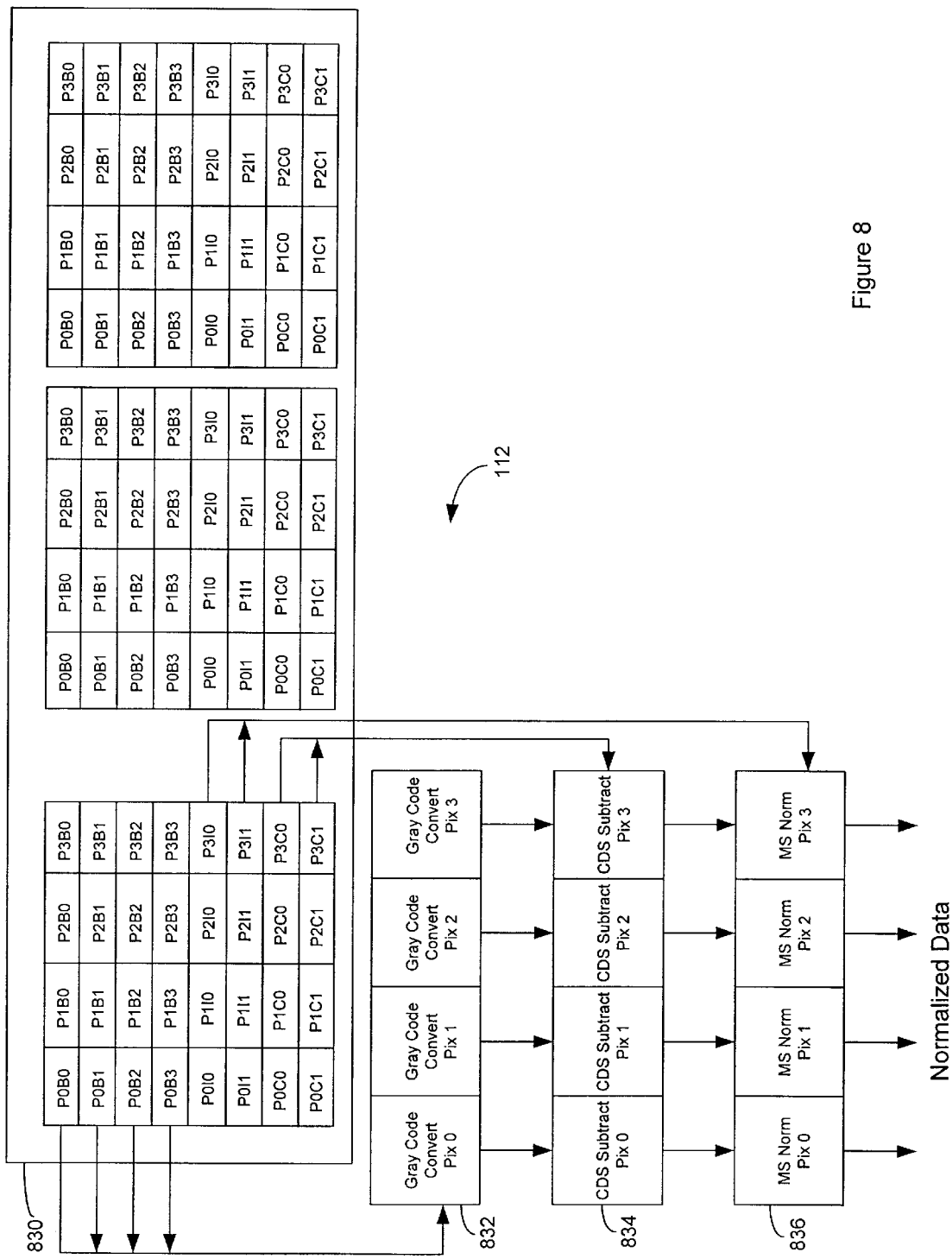
FIG. 8 illustrates a pixel normalization circuit according to one embodiment of the present invention.

In the present embodiment, the pixel rearrangement operation of pixel normalization circuit 112 is performed entirely by routing or hard-wiring of connections between memory 110 and pixel normalization circuit 112. FIG. 8 illustrates a pixel normalization circuit 112 according to one embodiment of the present invention. In FIG. 8, pixel normalization circuit 112 performs pixel rearrangement operation and other pixel normalization functions. However, this is illustrative only and a person of ordinary skill in the art would appreciate that pixel normalization circuit 112 can be constructed for the purpose of pixel rearrangement only.

Referring to FIG. 8, pixel normalization circuit 112 includes a buffer 830 for storing one block of pixel data from memory 110 for normalization processing. At each processing cycle, a portion of the pixel data in buffer 830 is operated on and is referred to as a conversion window. In FIG. 8, the conversion window is 4-pixel wide, that is, it includes four columns of buffer 830. When circuit 112 completes processing of the pixel data within the conversion window, circuit 112 proceeds to operate on pixel data within the next conversion window, that is the next four columns of buffer 830. Buffer 830 in FIG. 8 is illustrated as being divided into three separate blocks. This is intended to illustrate the operation of the conversion window of circuit 112. In actual implementation, buffer 830 can be implemented in any fashion and no physical separation is necessary between the columns of each of the conversion window.

In the present embodiment, pixel normalization circuit 112 reads out the first row of pixel data from each of the bit planes in memory 110 and stores the data in buffer 830 of circuit 112. In the present embodiment, it is assumed that both memory 110 and buffer 830 are 12-bit wide and each pixel data has 4 bits. By reading the first row of pixel data from each bit plane, buffer 830 holds the 4-bit pixel data for each pixel in the vertical columns of buffer 830. For example, in column one of buffer 830, bits 0 to 3 of pixel 0 are stored; and in column two, bits 0 to 3 of pixel 1 are stored and so on. In FIG. 8, buffer 830 also contains data values used for other normalization functions as will be described in more detail below. By connecting the output terminals of buffer 830 to bus 109 or bus 108 so that buffer 830 outputs the pixel data in a columnar order, the pixel data can be rearranged into a pixel bit arrangement. The rearranged pixel data can then be outputted on bus 109 or written back to memory 110 in the pixel bit order. After all the pixel data in buffer 830 are processed, the rearrangement operation continues by loading the second row of pixel data from each of the bit planes stored in memory 110 into buffer 830 and outputting the pixel data in the desired pixel bit order on bus 109 or on bus 108 for write back to memory 110.

In the case where the rearranged pixel data are to be rewritten back to memory 110, the data will be written to address locations from which the pixel bits have been read. For example, in FIG. 8, pixel data from the first row of each of the bit planes were read out into buffer 830. The rearranged data will be written back to the first rows of each bit plane but in the proper pixel order. Even though the pixel bits of the pixel data are not located in consecutive rows in memory 110, they are separated by a known number of rows and the pixel data can be read out in a consecutive order by modifying the addressing scheme of memory 110 according to means well known in memory addressing.

According to another embodiment of the present invention, the sensor readout from DPS array 102 can be written to memory 110 using a modified addressing scheme so that adjacent pixel bits are written to consecutive rows in memory 110. In that case, when a bit plane is outputted on bus 103, the first row of bits is written to the first row in memory location 220 and the subsequent rows of bits from DPS array 102 are written to a row k number of rows apart from the previous row. The next bit plane is written to the second row in memory location 220 and the subsequent rows are also written in rows k numbers apart. The resultant memory configuration is the same as the pixel configuration in buffer 830 in FIG. 8 in the case of a 4-bit pixel. When pixel bits are written in memory 110 using a modified addressing scheme, pixel normalization circuit 112 merely reads the consecutive rows of pixel data into buffer 830 and perform pixel normalization operations as needed. In this case, the rearranged pixel data can be rewritten back to memory 110 in a pixel bit order so that memory 110 assumes the pixel bit configuration shown in FIG. 4.

In the above description, memory 110 and buffer 830 are both 12-bit wide and the pixel data has 4 bts. This is illustrative only and the pixel normalization circuit of the present invention can be used with a k-bit pixel data and memory 110 and buffer 830 can have other dimensions.

In one embodiment, the routing for pixel rearrangement operation is performed by hard-wiring the pixel data in memory 110 to pixel normalization circuit 112 on bus 107 so that data are read out into buffer 830 from rows of memory 110 and then hard-wiring the pixel data in buffer 830 to memory 110 on bus 108 so that pixel data are read out from buffer 830 in columns.

For best performance and efficient operation of image sensor 100, the width of DPS array 102 and the width of memory 110 should be chosen to be an integer multiple of the number of pixel bits k. In this case, the logical connection between memory 110 and pixel normalization circuit 112 is greatly simplified. If the width of DPS array 102 is not an integer multiple of k, then the width of memory 110 has to be chosen to be the next integer multiple of k that is greater than the width of DPS array 102. Although the pixel rearrangement operation will work in the same manner as described above, there will be unused rows of memory 110 left at the conclusion of the pixel rearrangement operation.

According to another aspect of the present invention, pixel normalization circuit 112 includes circuits for performing other pixel data normalization operations as illustrated in FIG. 8. Pixel normalization circuit 112 integrates all of the normalization function on the same integrated circuit chip of the image sensor, thus improving the speed and efficiency of the image sensor. In the present embodiment, besides pixel rearrangement, pixel normalization circuit 112 includes circuits for performing Gray code conversion, digital correlated double sampling (CDS) operation, and multiple sampling normalization. However, the present embodiment is illustrative only and pixel normalization circuit 112 may include any one of or any numbers of normalization operations.

As described above, pixel normalization circuit 112 includes buffer 830 for storing pixel data to be processed. Circuit 112 further includes a bank of Gray code conversion circuits 832, a bank of CDS subtract circuits 834, and a bank of multiple sampling normalization circuits 836 (denoted as MS Norm circuits). As described above, normalization operations of circuit 112 are performed on the portion of the pixel data stored in buffer 830 within the conversion window. The pixel data within the conversion window are read from buffer 830. Each time the pixel data in the conversion window are processed, the data are either outputted on bus 109 or are written back into memory 110 on bus 108. Circuit 112 then proceeds to the next group of pixel data within the conversion window and performs normalization in the same manner. The process continues until all of the pixel data stored in buffer 830 are processed. In the embodiment shown in FIG. 8, the conversion window is 4 bit wide. Although the conversion window can have any dimension, for efficient operation, the conversion window is preferably an integer quotient of the width of buffer 830.

In buffer 830 of FIG. 8, the data loaded into buffer 830 include not only the pixel data for one row of pixels in memory 110 but also includes the time index information and CDS subtract values associated with the pixel data. Here, the 2-bit time index information is loaded into rows 5 and 6 of buffer 830 and the two-bit CDS subtract value is loaded into rows 7 and 8 of buffer 830.

As mentioned above, pixel data generated by DPS array 102 are represented in Gray code. Gray code is used because it is less susceptible to noise errors. The Gray code represented pixel data need to be converted to binary representation to be useful in other image processing operations. An exemplary 4-bit Gray code to binary conversion table is illustrated below.

| Grey Code | Binary |
| --- | --- |
| 0000 | 0000 |
| 0001 | 0001 |
| 0011 | 0010 |
| 0010 | 0011 |
| 0110 | 0100 |
| 0111 | 0101 |
| 0101 | 0110 |
| 0100 | 0111 |
| 1100 | 1000 |
| 1101 | 1001 |
| 1111 | 1010 |
| 1110 | 1011 |
| 1010 | 1100 |
| 1011 | 1101 |
| 1001 | 1110 |
| 1000 | 1111 |

Circuits for forming Gray code conversion are known and one of ordinary skill in the art would know how to implement a circuit for an n-bit Gray code to binary conversion. For example, Gray code to binary conversion can be implemented using a recursive XOR operation on each of the bit starting with the most significant bit (MSB) and the next MSB. The recursive XOR operation continues using the results of the previous XOR'ed bit with the next bit in the Gray code number until the least significant bit (LSB) is reached. The recursive logic equations for converting an n-bit Gray code value are as follows:

Binary MSB=Gray MSB;

Binary MSB-1=Binary MSB XOR Gray MSB-1;

Binary MSB-2=Binary MSB-1 XOR Gray MSB-2;

Binary MSB-(n−2)=Binary MSB-(n−3) XOR Gray MSB-(n−2); and

Binary LSB=binary LSB+1 XOR Gray LSB where Binary MSB represents the binary bit value for the MSB and Gray MSB represents the Gray code value for the MSB and so on. FIG. 5 illustrates a straightforward implementation of the recursive logic equations above for converting a 15-bit Gray code number. In the straightforward implementation, conversion circuit 500 of FIG. 5 includes a series of XOR gates where the results of the previous conversion is cascaded through to the least significant bit. While conversion circuit 500 is simple and uses a minimum number of XOR gates, the delay time for the LSB is significantly longer than that of the MSB as the conversion time depends on the XOR results rippling through to the last XOR of the LSB. In conversion circuit 500, only 14 XOR gates are needed to implement the Gray code conversion but the number of gate delays for the LSB is also 14 XOR gates. For an n-bit conversion, the straightforward implementation requires n−1 XOR gates and has n−1 XOR gate delays. The straightforward implementation is sometimes undesirable because the delay time for the LSB can be significantly longer than that of the MSB, especially for large number of bits.

Figure 9:
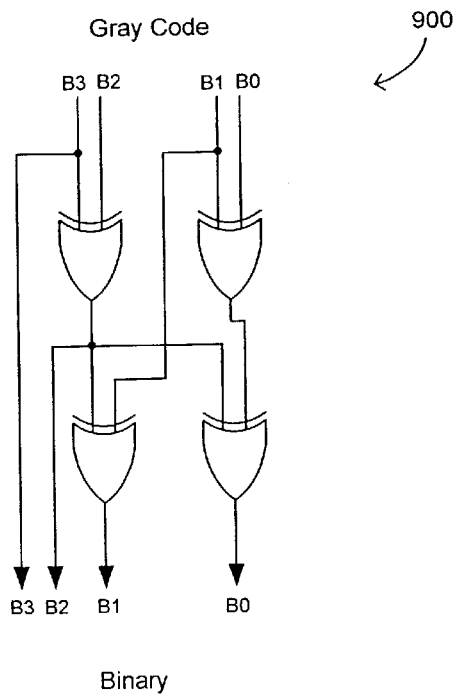
FIG. 9 illustrates a circuit diagram for a 4-bit Gray code to binary conversion circuit according to one embodiment of the present invention.

According to one embodiment of the present invention, pixel normalization circuit 112 of image sensor 100 implements Gray code to binary conversion using the circuit shown in FIG. 5. For a 4-bit pixel data, only 3 XOR gates are needed and each of conversion circuits 832 is implemented as the XOR circuit for bits MSB to MSB-3 in circuit 500 of FIG. 5. The LSB of conversion circuits 832 has a gate delay of 3 XOR gates. In accordance with another aspect of the present invention, a circuit for performing n-bit Gray code to binary conversion is provided which operates at a high conversion speed and minimizes disparity in conversion delay time between the most significant bit (MSB) and the least significant bit (LSB) of the Gray code value. FIG. 9 illustrates a 4-bit Gray code conversion circuit according to one embodiment of the present invention. In another embodiment of image sensor 100, pixel normalization circuit 112 implements Gray code conversion for the 4-bit pixel data using conversion circuit 900 shown in FIG. 9 to enhance the operation of image sensor 100. Conversion circuit 900 uses 4 XOR gates but has a gate delay time of only 2 XOR gates for the LSB (B0), one gate delay less than the straightforward implementation of FIG. 5. The novel Gray code to binary conversion circuit of the present invention, including the implementation of an n-bit conversion circuit, will be described in more detail below with respect to FIGS. 10 to 15.

As shown in FIG. 8, pixel normalization circuit 112 further includes a bank of CDS subtract circuits 834 for implementing the correlated double sampling (CDS) methodology. CDS is a method for eliminating non-uniformity in the sensor array due to fixed pattern noise. In this case, CDS is used to correct for the variable comparator offset values between the photodetectors in the array. In the present embodiment, a digital CDS methodology is implemented. After the sensor array is reset, the reset values of each of the photodetectors are measured and stored in memory location 226 of memory 110. Subsequently, for each frame of pixel data captured by the sensor array, the stored reset values are subtracted from the pixel value to normalize the pixel data. In pixel normalization circuit 112, CDS subtract circuits 834 are constructed to perform the subtraction operation on the pixel data. In FIG. 8, pixel data within the conversion window (i.e. pixel data for pixels 0 to 3) are first converted from Gray code representation to binary representation. The binary pixel data are then provided to CDS subtract circuits 834. The reset values stored in buffer 830 are also provided to CDS subtract circuits 834. CDS subtract circuits 834 subtract the reset value from the pixel data for each pixel. The subtraction operation of CDS subtract circuits 834 can be implemented according to methods known by persons skilled in the art.

In the present embodiment, after CDS subtract circuits 834 operate on the binary pixel data, the CDS normalized pixel data are provided to multiple sampling normalization circuits 836. As described above, multiple sampling is an algorithm used to increase the dynamic range of a sensor array by performing multiple reads from the sensor array over time and then normalizing the readout values based on the multiple sampling information. An image based on the normalized pixel data can be created with a simulated sensitivity range much greater than the actual sensitivity range of the sensor elements. In the present embodiment, image sensor 100 implements multiple sampling according to the method described in U.S. patent application Ser. No. 09/567,786 which uses a time-indexed method in multiple sampling. Of course, other multiple sampling algorithms may also be used with the image sensor of the present invention.

Figure 6:
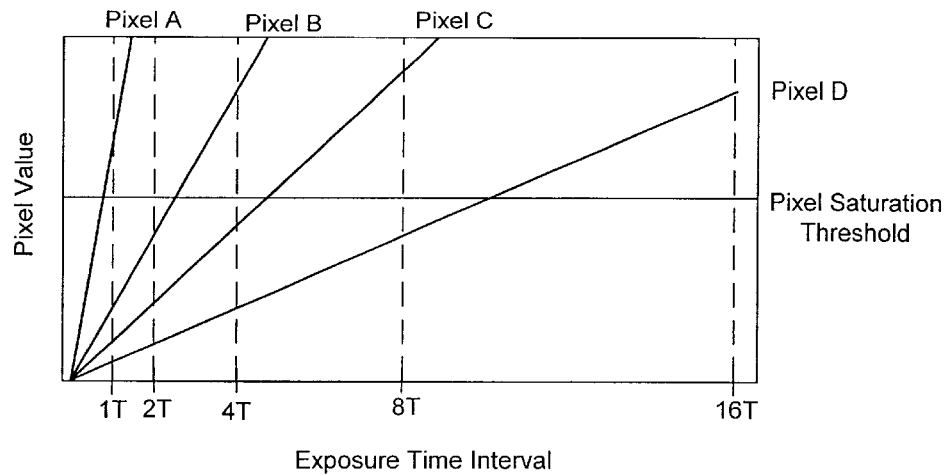
FIG. 6 illustrates the pixel intensity values vs. time for four representative pixels in the image array of the image sensor of FIG. 1.
Figure 7:
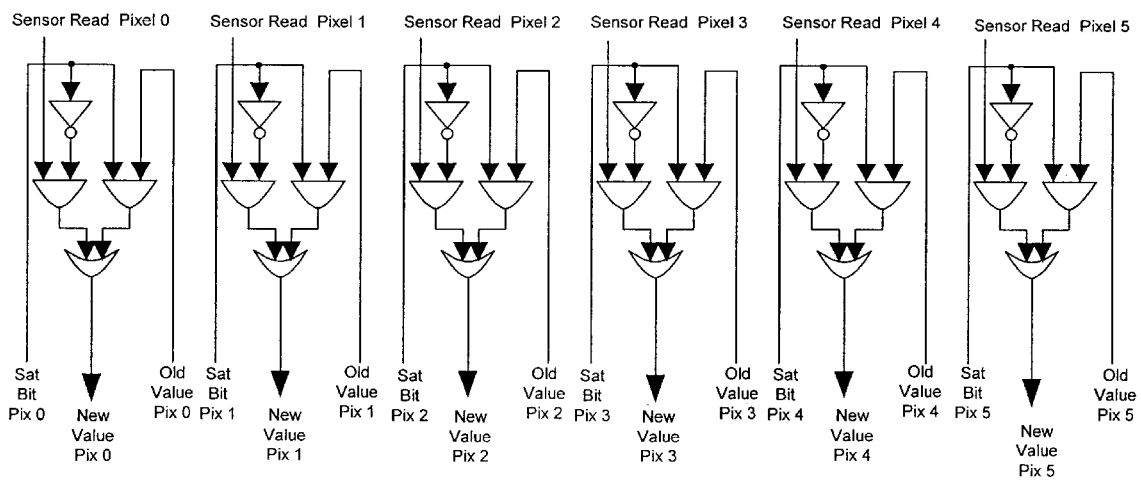
FIG. 7 illustrates one embodiment of multiple sampling update circuit 104 for use in the image sensor of FIG. 1.

The operation of multiple sampling in image sensor 100 will now be described in brief. The detailed multiple sampling operation can be found in the above referenced patent application. FIG. 6 illustrates the pixel intensity values vs. exposure time for four representative pixels A, B, C, and D in DPS array 102. When multiple sampling is used, pixel values are first read out at an exposure time 1T and multiple sampling update circuit 104 performs a saturation comparison operation on the pixel values. The saturation comparison operation can be implemented in a variety of ways. In one embodiment, a 50% saturation threshold is used. Thus, at time 1T, multiple sampling update circuit 104 compares the pixel values readout from DPS array 102 and determines which of the pixel intensity values exceeds the 50% saturation threshold. For example, in FIG. 6, pixel A has an intensity value exceeding the 50% pixel saturation threshold while pixels B to D have intensity values below the saturation threshold. Multiple sampling update circuit 104 writes the pixel values for pixels A to D into memory 110. Multiple sampling update circuit 104 also set the threshold indicator bit corresponding to pixel A in memory location 222 to a predetermined value, such as "1" to indicate that pixel A has reached saturation. By setting the threshold indicator bit of pixel A, multiple sampling update circuit 104 will prevent further updating of pixel values into memory 110 for pixel A. Multiple sampling update circuit 104 also stores the time index 1T for pixel A in memory location 224. The pixel value and the time index value for pixel A will be used by pixel normalization circuit 112 to derive the simulated intensity value of pixel A. In FIG. 6, the multiple sampling process continues with sensor readout being taken after exposure times of 2T, 4T, 8T and 16T. Each time the pixel intensity value for a pixel exceeds the 50% saturation threshold, the threshold indicator bit is set and the saturation time index for that pixel is stored in memory 110 together with the measured pixel values. FIG. 7 illustrates one embodiment of multiple sampling update circuit 104 for use in image sensor 100. Other implementations are also possible as recognized by one of ordinary skill in the art.

In another embodiment, the saturation threshold level is chosen to be a value close to the saturation level of the photodetectors. For example, a 90% saturation threshold can be used. When a 90% saturation threshold is used, multiple sampling update circuit 104 will write and update pixel values in memory 110 until a pixel value exceeds the 90% saturation threshold. In memory 110, memory location 222 stores a saturation bit for each of the pixels in sensor array 102. The saturation bit is set to a predetermined value, such as "1," whenever the pixel value for a pixel exceeds the 90% threshold. In that case, the saturated pixel value will not be written to memory 110. Instead, multiple sampling update circuit 104 will store the time index when saturation is detected. For example, assuming that the pixel saturation level in FIG. 6 is at a 90% level, then at time 1T, pixel A is already saturated and a predetermine pixel value will be written to memory 110 and the time index 1T will be stored for pixel A and the saturation bit for pixel A will also be set to "1." Pixel B, on the other hand, did not become saturated until a time 4T. At time 4T, multiple sampling update circuit 104 will not write over the pixel value already stored for pixel B but will update the time index and saturation bit for pixel B instead. The pixel value for pixel B before saturation and the time index where saturation occurs will be used by pixel normalization circuit 112 to determine the simulated pixel value for pixel B. In another embodiment of the multiple sampling update circuit, the saturation bit can be used as a write mask for memory 110. Thus, the saturation bit acts as the write enable signal for each of the pixels and determines whether pixel data is to be written to memory 110.

After a desired number of sampling, image sensor 100 has captured the light intensity values for all of the pixels in the image. Memory 110 has stored the pixel values of each pixel before the photodetectors become saturated. Memory 110 has also stored the time index values for each pixel corresponding to time when the pixel became saturated. Pixel normalization circuit 112 performs multiple sampling normalization operation on the pixel data based on the pixel value and the time index values stored for each pixel. Multiple sampling normalization assumes that the pixel value's response to light over time is linear. The linear response approximation is a good approximation for CMOS sensors. The multiple sampling normalization is achieved by multiplying the pixel value by a constant corresponding to the ratio of the total exposure time to the time the pixel saturates.

Referring to FIG. 6, the normalized pixel value for Pixel A will be the pixel value read out of the pixel array at the time interval after the saturation of Pixel A (i.e. at time 1T) multiplied by the ratio of the time of the total exposure (16T) to the saturation time interval (1T). Hence, the following equation gives the normalized value for Pixel A:

$$Pixel\ A(norm) = Pixel\ A(read) \times \left(\frac{Total\ Exposure\ Time}{Saturated\ Exposure\ Time}\right)$$

$$= Pixel\ A(read) \times \left(\frac{16}{1}\right) = Pixel\ A(read) \times 16.$$

Similarly, the normalized values for Pixels B to D will be given as:

$$Pixel\ B(norm) = Pixel\ B(read) \times \left(\frac{16}{4}\right) = Pixel\ B(read) \times 4;$$

$$Pixel\ C(norm) = Pixel\ C(read) \times \left(\frac{16}{8}\right) = Pixel\ C(read) \times 2;\ and$$

-continued $$\text{Pixel } D(norm) = \text{Pixel } D(read) \times \left(\frac{16}{16}\right) = \text{Pixel } D(read).$$

The above equations illustrate the normalization operation when a 50% saturation threshold value is chosen. Of course, the same normalization operation can be applied for a 90% saturation threshold value. In pixel normalization circuit 112, multiple sampling normalization circuits 836 implement the multiple sampling normalization operation stated above to provide pixel data output having a wide dynamic range. Circuits 836 uses the time index values stored in buffer 830 of pixel normalization circuit 112, such as at rows 5 and 6 of buffer 830, for the normalization calculation. Multiple sampling normalization circuits 836 operate on the pixel data and the time index values to compute the normalized pixel data.

According to another aspect of the present invention, a circuit for performing n-bit Gray code to binary conversion is provided. The Gray code conversion circuit of the present invention achieves a significant reduction in gate delay time for converting the lower order bits of an n-bit Gray code value. In one embodiment, a 15-bit Gray code conversion circuit according to the present invention has only 4 XOR gate delays, as compared to the 14 XOR gate delays in a straightforward implementation. Image sensor 100 of the present invention incorporates the Gray code conversion circuit of the present invention to enhance the speed of operation of image sensor 100.

Gray code to binary conversion can be implemented using the recursive XOR equations described above. Instead of the straightforward implementation of the recursive XOR equations which results in a long delay time for the LSB, the Gray code to binary conversion circuit of the present invention uses a nested XOR tree architecture to minimize the delay time for the LSB. The delay time for the LSB of an n-bit Gray code number is the critical path of the conversion circuit because it is the maximum delay through an n-bit Gray code conversion circuit. In accordance with the present invention, a method is provided for generating a Gray code to binary conversion circuit for an n-bit Gray code number which minimizes the delay time of the critical path. Furthermore, the method of the present invention also allows the number of XOR gates, or the circuit area, in the circuit to be minimized while maintaining the shortest delay time in the critical path.

Figure 10:
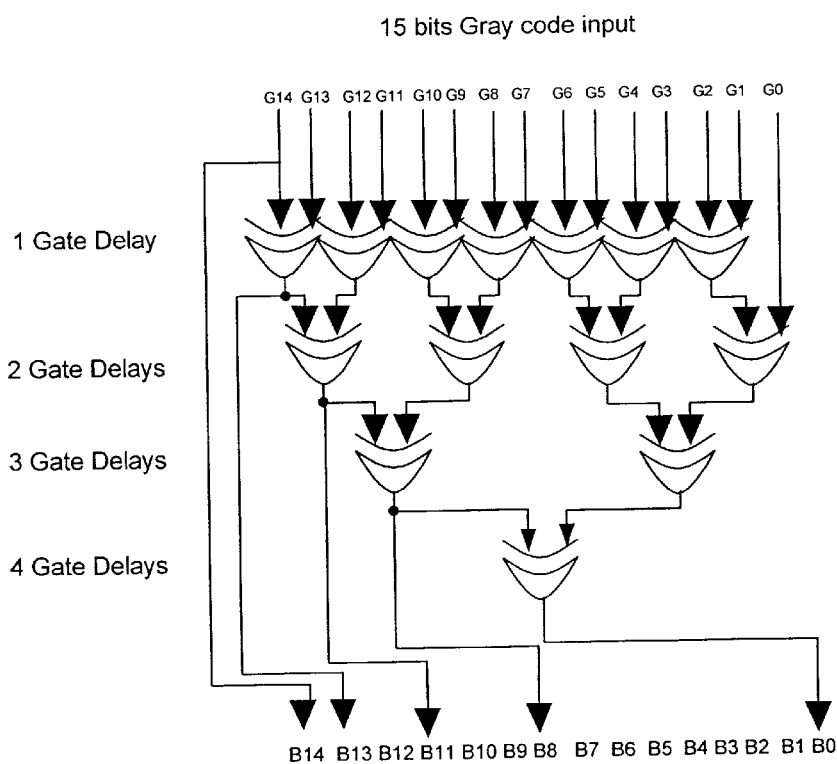
FIG. 10 illustrates a nested XOR tree for computing the binary value of the least significant bit of a 15-bit Gray code number according to one embodiment of the present invention.

The conversion circuit and the method of constructing the circuit will be described with respect to a 15-bit Gray code number. Of course, the circuit and method of the present invention can be applied to any n-bit Gray code number. First, a nested XOR tree is constructed for converting the LSB B0 of the binary value using the 15-bit Gray code number. The XOR tree is constructed with the goal of minimizing the delay time of the critical path. FIG. 10 illustrates a nested XOR tree 1010 for a 15-bit Gray code number. The minimum number of gate delays for converting the binary LSB of an n-bit Gray code to binary conversion circuit using 2-input XOR gates is $\log_2 n$. For a 15-bit Gray code number, the number of gate delays is 4 as shown in FIG. 10. To obtain the binary LSB B0 by converting bits G0 to G14 of the 15-bits Gray-code number, XOR tree 1010 of FIG. 10 includes four layers of XOR gates. In the first layer, seven 2-input XOR gates perform XOR operation on pairs of bits G14 to G1 of the 15-bit Gray code input value. At the second layer, four 2-input XOR gates perform XOR operation of the XOR'ed results of the first layer and the LSB bit G0. If n is an even number, then the first layer operates on all n-bits of the input value and the second layer operates on the XOR'ed results of the first layer. The conversion process continues in the third layer with the XOR operation of the four XOR'ed results of the second layer. Finally, the binary value B0 of the LSB is generated by the XOR gate in the fourth layer. In this manner, XOR tree 1010 is constructed for converting the LSB of the 15-bit Gray code input value where the critical path has a delay of only 4 XOR gates.

While it is possible to generate an XOR tree for each of the binary output bits, such an implementation is impractical because the conversion of each of the bits shares logical terms and duplication of logical circuits results if each bit has its own XOR tree. Instead, the next step in constructing the conversion circuit for the 15-bit Gray code input value involves recognizing that XOR tree 1010 of FIG. 10 includes converted binary values for output bits other than the LSB (bit B0). Referring to FIG. 10, XOR tree 1010 also generates binary values of bits B14, B13, B11 and B8. Thus, what is left is to complete the conversion circuit by filling in XOR gates for converting the remaining bits.

Figure 11:
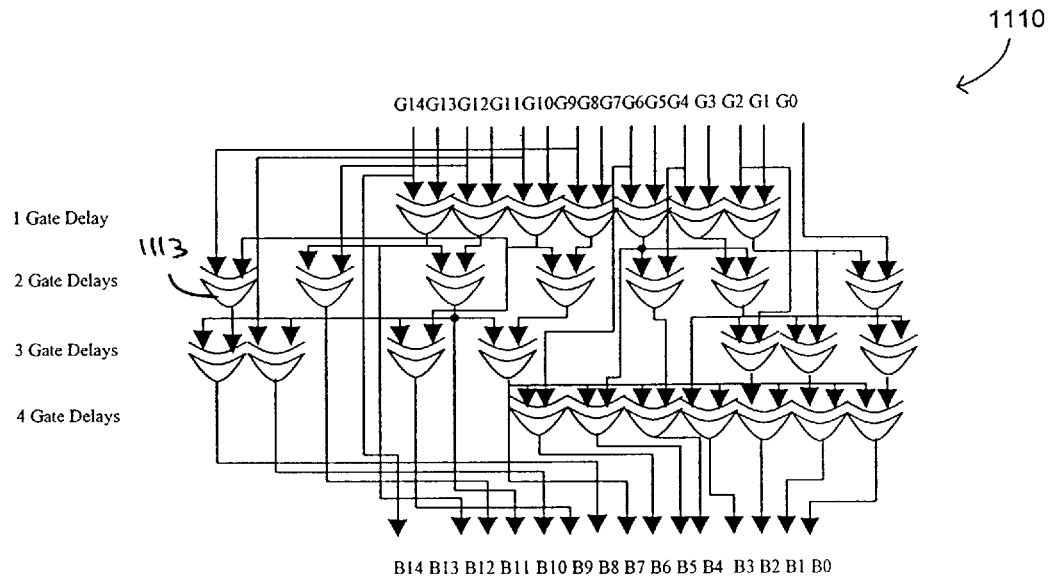
FIG. 11 illustrates an XOR tree for converting all bits of a 15-bit Gray code input value into the 15-bit binary output value according to one embodiment of the present invention.

Next, XOR gates are added in XOR tree 1010 for converting the bits not yet converted. In FIG. 10, the remaining unconverted bits are B12, B10, B9, and B7 to B1. The primary limitation here is that the addition of XOR gates for the conversion of the remaining bits does not create more gate delays than the gate delays for the LSB. That is, all of the remaining bits should be converted with the maximum delay of $\log_2 n$ or 4 gate delays for a 15-bit Gray code value. The goal is to reuse as many of the logical terms already generated in the XOR tree 1010 as possible. FIG. 11 illustrates an XOR tree 1110 for converting all 15 bits of the Gray code input value into the 15-bit binary output value. XOR tree 1110 includes XOR tree 1010 of FIG. 10 and additional XOR gates for converting the remaining bits. In XOR tree 1110, a total of 28 XOR gates are used and the 4-XOR gate delay is maintained.

Figure 12:
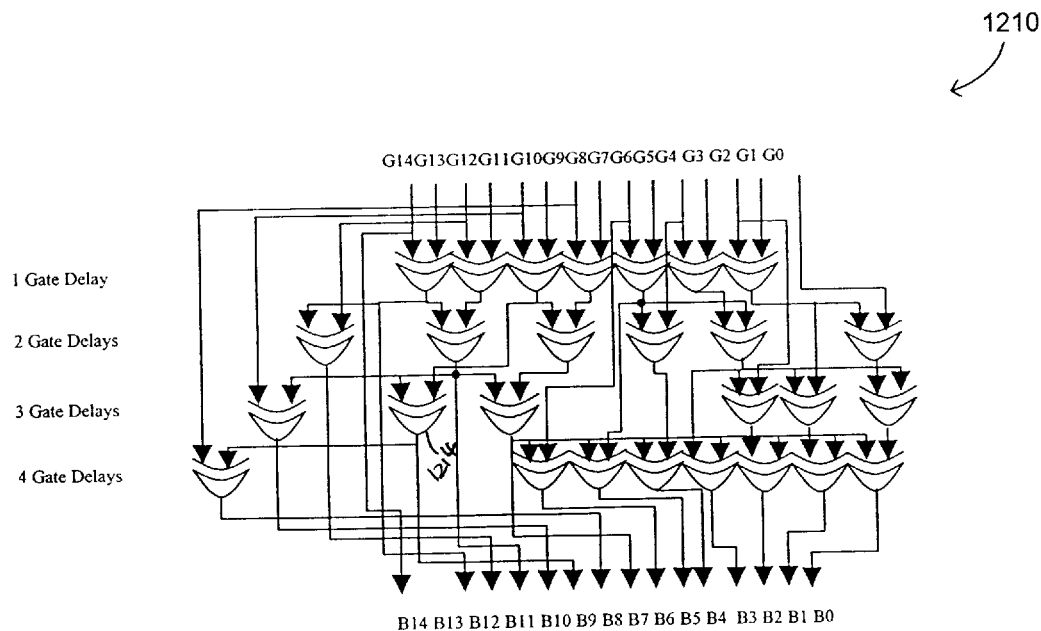
FIG. 12 illustrates a 15-bit Gray code to binary conversion circuit according to another embodiment of the present invention.

In certain applications, it is desirable to minimize the area needed for implementing the Gray code conversion circuit of the present invention. In such cases, the conversion circuit of the present invention can be optimized for minimal area as well as critical path delay time. The optimization is performed by rearranging the XOR circuits of one or more of the bits, other than the LSB, so that fewer XOR gates are used to generate the binary values of the bits. This is achieved by maximizing the usage of shared terms in generating the binary bits. Even though the rearrangement of the XOR gates may lead to increased gate delays for a particular bit, the overall delay time, that is the delay time for the critical path, is maintained. FIG. 12 illustrates one embodiment of an 15-bit Gray code to binary conversion circuit where the conversion circuit for bit B8 has been rearranged to minimize the circuit area. In FIG. 11, circuit 1110 uses 28 gates and has a 4-XOR gate delay. Circuit 1110 computes bit B8 in 3 XOR gate delays. Specifically, bits G10 and G9 are XOR'ed. The result is XOR'ed with bit GB. The result is again XOR'ed with the result of XOR'ing bits G14, G13, G12, and G11. However, circuit 1110 can be optimized for area by eliminating at least one XOR gate. Referring to circuit 1210 of FIG. 12, binary output bit B8 is generated using the output of XOR gate 1214. The XOR gate 1113 of FIG. 11 is eliminated. As a result, circuit 1210 is implemented using only 27 gates, one less than circuit 1110 of FIG. 11, and maintains the 4-XOR gate delay in the critical path. Although B8 now has a 4 XOR-gate delay as opposed to 3 of the previous circuit, this is the same as the delay time for the critical path so the performance of the overall conversion circuit is not affected. In this manner, the n-bit Gray code to binary conversion circuit of the present invention can be optimized for circuit area as well as critical path delay time.

Figure 13:
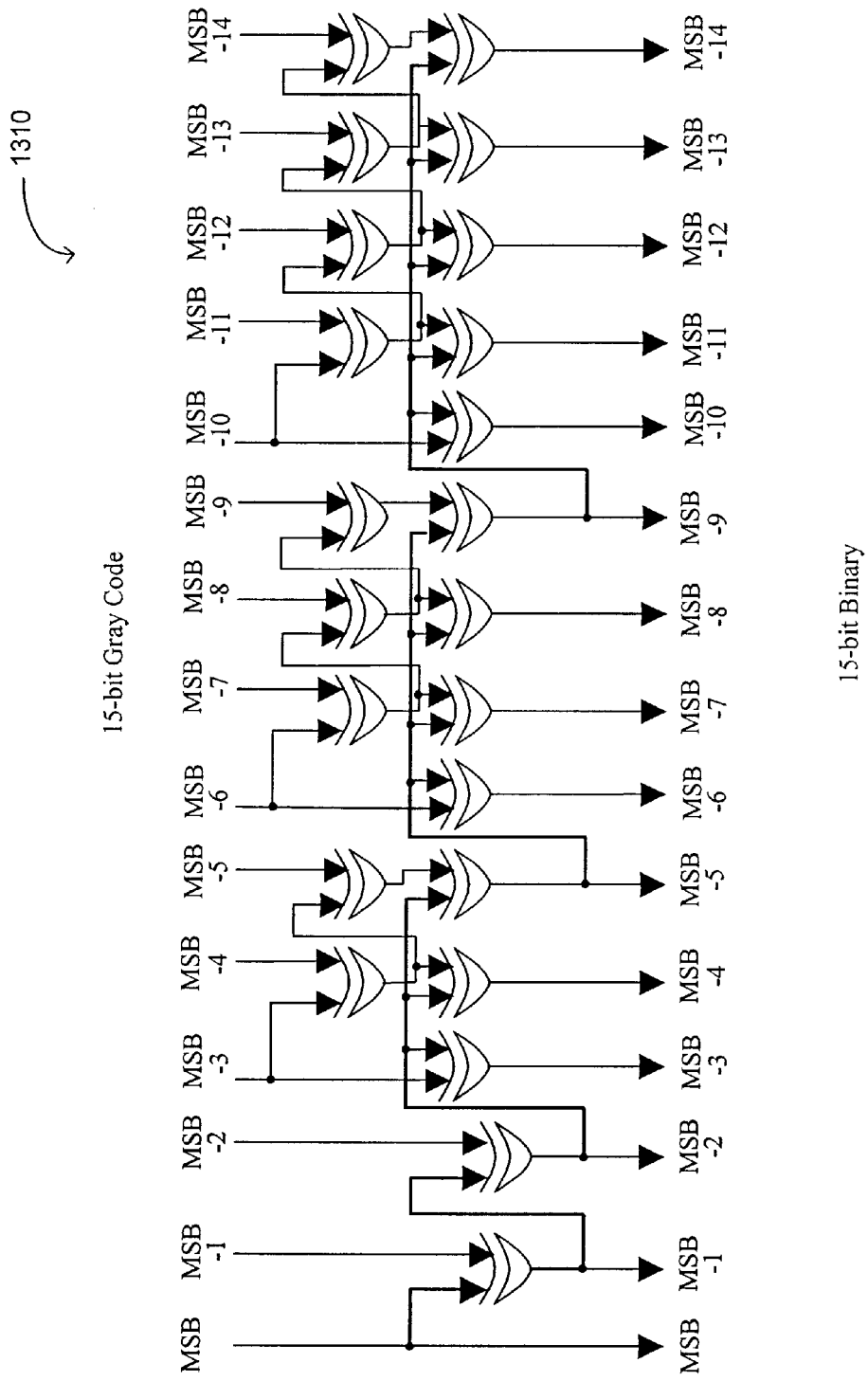
FIG. 13 illustrates a 15-bit Gray code to binary conversion circuit according to yet another embodiment of the present invention.

In certain cases, it is necessary to minimize the circuit area of the Gray code conversion circuit of the present invention even if the critical path gate delays need to be extended. FIG. 13 illustrates a 15-bit Gray code to binary conversion circuit according to another embodiment of the present invention. Conversion circuit 1310 has a 5-XOR gate delay in generating the LSB (bit MSB-14) but uses only 23 XOR gates in total. Circuit 1310 reduces the number of XOR gates by four while increasing the critical path delay time by only one XOR gate. Conversion circuit 1310 is suitable when a minimal circuit area is desired and some delay time can be sacrificed.

In summary, in the above-described method of the present invention, an n-bit Gray code to binary conversion circuit is implemented by constructing a nested XOR tree. The XOR tree is constructed by first optimizing the delay time for the critical path which is the conversion of the least significant bit (LSB). For bits not on the critical path, the XOR tree is constructed by minimizing the circuit area. Thus, the XOR tree is constructed by reusing the closest logic terms already implemented for the LSB or other bits. By relying on implemented terms and ripple logic as much as possible but within the gate delay of the critical path, the smallest circuit area can be achieved. Of course, different variations of the n-bit Gray code to binary conversion circuit of the present invention can be implemented by optimizing either for the critical path delay time or for circuit area or both.

Figure 14:
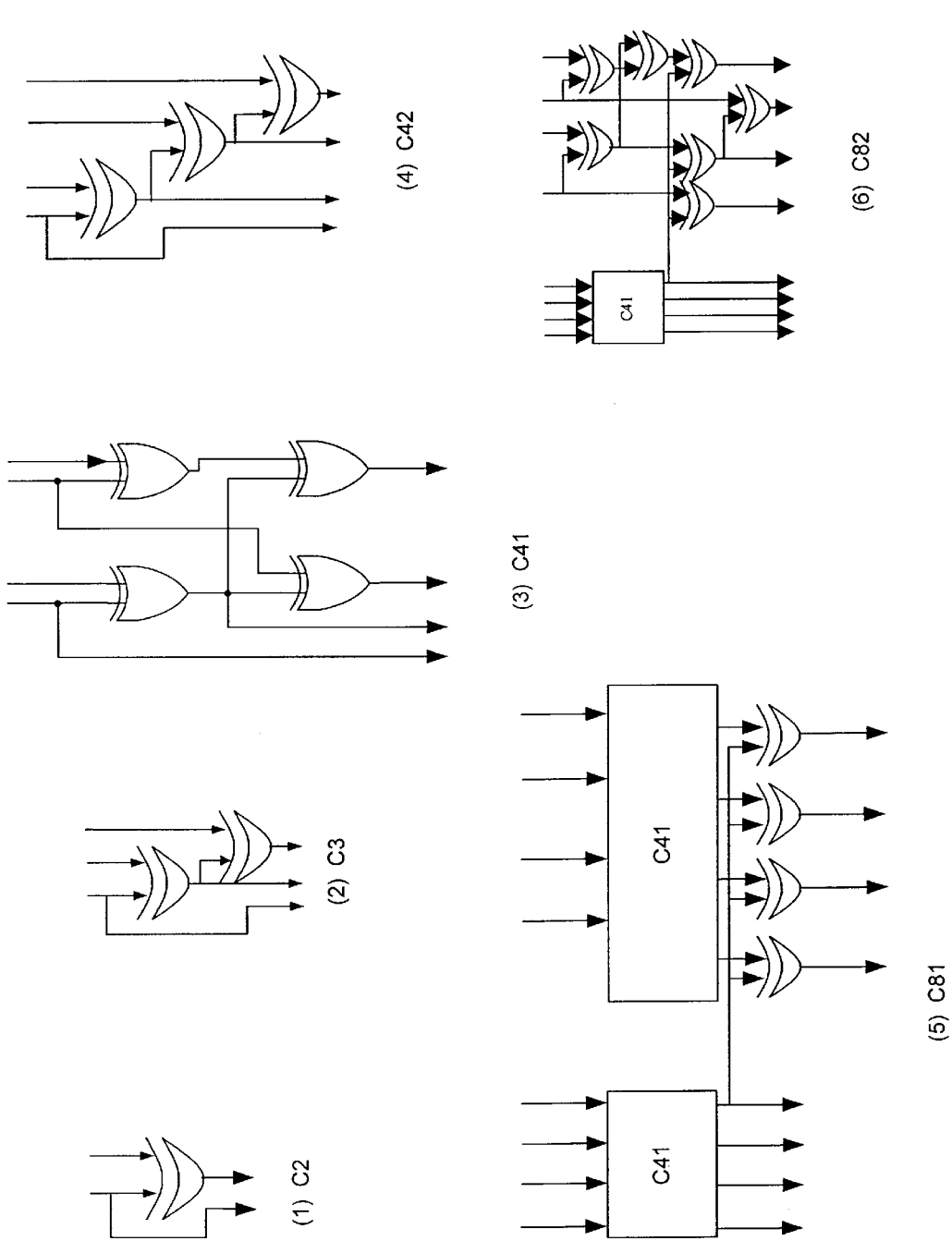
FIG. 14 illustrates a number of building blocks used for constructing an n-bit Gray code to binary conversion circuit according to one embodiment of the present invention.

In accordance with another aspect of the present invention, another method for constructing an n-bit Gray code to binary conversion circuit is provided. The n-bit Gray code to binary conversion circuit is implemented by selecting and combining a number of building blocks. While several combinations of building blocks are possible for the same n-bit conversion circuit, the combinations have different numbers of total XOR gates and different numbers of XOR gate delays. In accordance with the present invention, a Gray code conversion circuit can be constructed to obtain the desired minimal circuit area and the desired minimal gate delays for the critical path. FIG. 14 illustrates a number of building blocks which can be used for constructing an n-bit Gray code to binary conversion circuit according to one embodiment of the present invention. In FIG. 14, six different building blocks for converting a 2-bit, 3-bit, 4-bit, and 8-bit Gray code number are shown. Block C2 is a 2-bit conversion circuit. Block C3 is a 3-bit conversion circuit having a 2-XOR gate delay. Blocks C41 and C42 are each a 4-bit conversion circuit where block C41 is optimized for gate delays and block C42 is optimized for circuit area. When a 4-bit conversion circuit is needed, either block C41 or block C42 can be used depending on whether the shortest delay time or the minimal circuit area is required.

The building blocks of FIG. 14 further include two 8-bit conversion circuits. Blocks C81 and C82 illustrate how the previous building blocks can be used advantageously in constructing more complex conversion circuit having a larger number of bits. For example, block 81 uses two instances of block C41 for the 8-bit Gray code conversion. In block C81, the $4^{th}$ most significant bit is used to ripple through to the least significant output bit. Block C81 uses 12 XOR gates and has a 3-XOR gate delay. Block C82, on the other hand, uses only one instance of block C41. The logic circuit for generating the four least significant bits in block C82 is optimized for area and not for delay time. Thus, block C82 uses 11 XOR gates but has a 4-XOR gate delay. In block C82, the critical path is actually bit 1, next to the least significant bit. The LSB of block C82 actually has only a 3-XOR gate delay.

Figure 15:
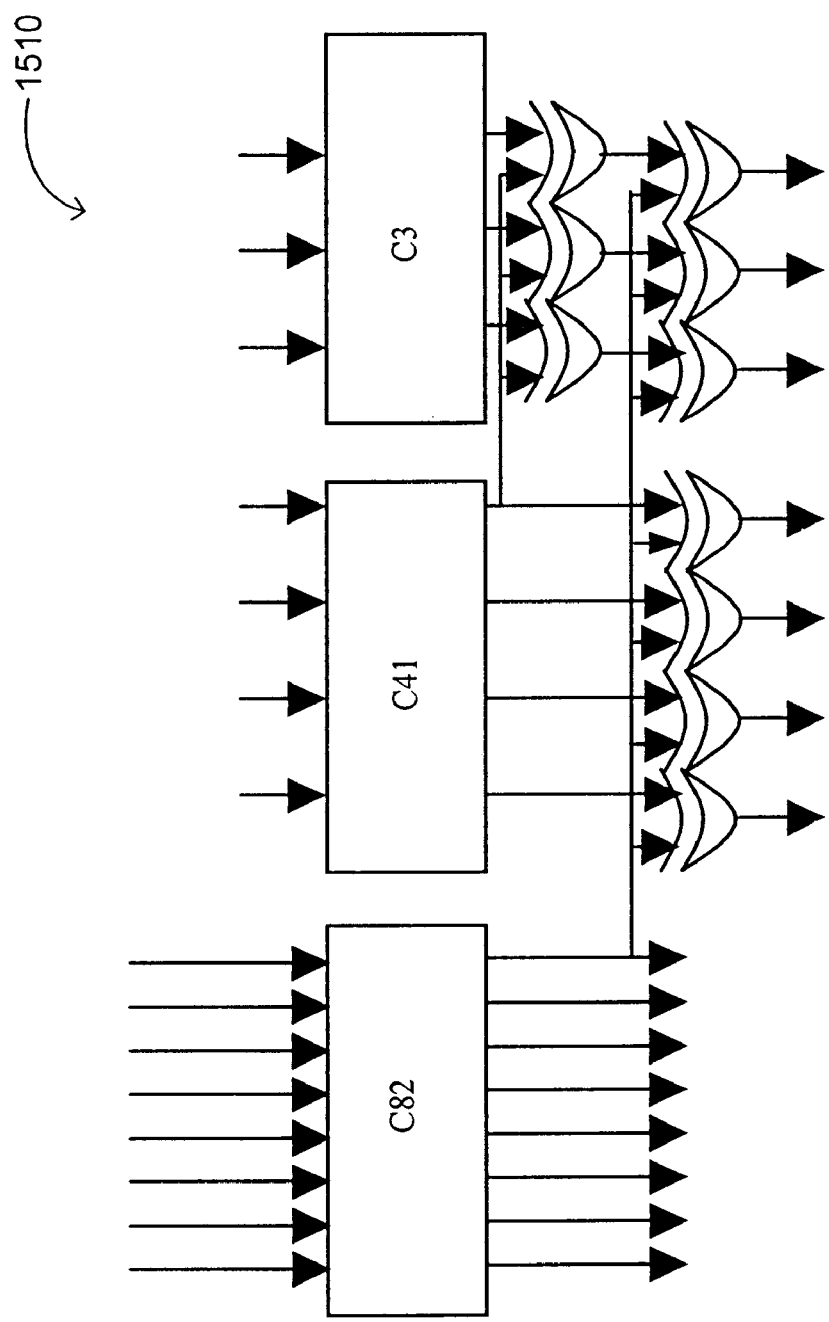
FIG. 15 illustrates a 15-bit Gray code to binary conversion circuit constructed using the building blocks of FIG. 14 according to one embodiment of the present invention.

By providing a number of building blocks, an n-bit Gray code to binary conversion circuit can be constructed by selecting and combining the appropriate number of building blocks and then adding ripple logic to complete the computation of the lower order bits. For example, conversion circuit 1210 of FIG. 12 can be constructed using building blocks C82, C41 and C3 as illustrated in FIG. 15. Conversion circuit 1510 is identical to circuit 1210 and has 27 XOR gates and a 4-XOR gate delay. The 27 XOR gates implementation is the smallest implementation for a 15-bit Gray code conversion circuit. Conversion circuits for any n-bit number can be constructed in a similar manner.

In the present embodiment, the building blocks are constructed using two-input XOR gates. Of course, other building blocks can be constructed using three or four-input XOR gates as well. The building blocks shown in FIG. 1 are illustrative only.

In summary, in one embodiment of the present invention, the operation of image sensor 100 incorporating pixel normalization circuit 112 is as follows. First, image sensor 100 performs a CDS initialization to reset DPS array 102. After the sensor array is reset, the reset values are read out and stored in memory 110 at memory location 226 (FIG. 2). DPS array 102 is then exposed to light for capturing an image. After the first exposure time interval (time 1T), multiple sampling update circuit 104 performs saturation level comparison and stores the pixel values, the time index, and the threshold indicator bit as needed in memory 110 depending on whether the pixel values have became saturated. The multiple sampling process continues for the full exposure time. Memory 110 has in storage the pixel values for all the pixels arranged in bit plane arrangement and also has in storage the threshold indicator values (memory location 222), the time index values (memory location 224) and the reset values (memory location 226). Pixel normalization circuit 112 then performs normalization operations by first loading the first rows of pixel data from each bit plane into buffer 830 (FIG. 8). The time index information and the reset subtract values associated with the pixels are also loaded into buffer 830. The portion of the pixel data within the conversion window are provided to Gray code conversion circuits 832 for converting the data from Gray code representation to binary representation. The binary pixel data are then coupled to CDS subtract circuits 834 where the reset values are subtracted from the binary pixel data. The CDS normalized data are then provided to multiple sampling normalization circuits 836 where the pixel data are normalized using the time index information. The final normalized data are either outputted on bus 109 in pixel bit arrangement or rewritten to memory 110 via bus 108, also in pixel bit arrangement. Pixel normalization circuit 112 then proceeds to process the next group of pixel data within the conversion window. The normalization process continues until all of the pixel data in buffer 830 is normalized. Then, pixel normalization circuit 112 loads the next rows of pixel data from each bit plane in memory 110 and the normalization process repeats as described above until all the pixel data are normalized.

In accordance with the principles of the present invention, an image sensor integrates a sensor array, a memory, and a pixel normalization circuit on one integrated circuit. The single-chip implementation improves the efficiency of the image sensor and makes the image sensor readily compatible with external systems. The image sensor of the present invention may be coupled to any imaging system for receiving the captured image without the need for intervening circuits to process the pixel data. These capabilities of an image sensor according to the present invention has not been realized by conventional image sensors.

The above detailed descriptions are provided to illustrate specific embodiments of the present invention and are not intended to be limiting. Numerous modifications and variations within the scope of the present invention are possible. The present invention is defined by the appended claims.

We claim:

1. A method for converting an n-bit Gray code number to an n-bit binary number, comprising:

computing binary value of least significant bit (LSB) of said n-bit Gray code number using an XOR tree, said XOR tree including a first set of XOR gates for evaluating said n-bit Gray code number and generating the binary value of said LSB in a shortest gate delay time;

determining in said XOR tree a first group of bits, other than said LSB, for which binary values of said first group of bits are also generated; and providing a second set of XOR gates for computing binary values of a second group of bits of said n-bit Gray code number, other than said first group of bits and said LSB, said second set of XOR gates computing said binary values in a gate delay time less than or equal to said shortest gate delay time of said XOR tree.

2. The method of claim 1, wherein a first bit in said first group of bits has a first gate delay time and said XOR tree has a first number of gates, said method further comprises:

rearranging said XOR tree to compute said first bit in a second gate delay time longer than said first gate delay time, said second gate delay time is less than or equal to said shortest gate delay time;

wherein said rearranging said XOR tree reduces the number of said first number of gates.

3. The method of claim 1, wherein said computing the binary value of the LSB of said n-bit Gray code number using an XOR tree comprises:

providing a first number of two-input XOR gates in a first computing stage when n is an even number, wherein said first computing stage generates results of XOR'ing two adjacent bits of said n-bit Gray code number;

providing a second number of two-input XOR gates in said first computing stage when n is an odd number wherein said first computing stage generates results of XOR'ing two adjacent bits of said n-bit Gray code number except said LSB;

providing a third number of two-input XOR gates in a second computing stage for XOR'ing the results of a previous computing stage and uncomputed bit from said previous computing stage, if any; and adding computing stages until said binary value of said LSB is computed.

4. The method of claim 1, wherein said computing the binary value of the LSB of said n-bit Gray code number using an XOR tree comprises:

(a) logically XOR'ing each of two adjacent bits of said n-bit Gray code number when n is an even number, providing a first series of result bits, (b) logically XOR'ing each of two adjacent bits of said n-bit Gray code number, except said LSB, when n is an odd number, providing said first series of result bits;

(c) logically XOR'ing each of two adjacent bits of said first series of result bits, when n is an even number, generating a second series of result bits;

(d) logically XOR'ing each of two adjacent bits of said first series of result bits and said LSB, when n is an odd number, generating said second series of result bits; and (e) repeating step (c) or (d) for said second series of result bits until said binary value of said LSB is computed.

5. A method for converting an n-bit Gray code number to an n-bit binary number, comprising:

providing a plurality of building blocks for converting 2-bit, 3-bit, and 4-bit Gray code numbers, each of said building blocks including one or more XOR gates and having the shortest gate delay time for converting a 2-bit, 3-bit or 4-bit Gray code number or having the least number of gates for converting a 4-bit Gray code number;

selecting a combination of said building blocks for converting said n-bit Gray code number; and providing a first set of XOR gates at output terminals of said building blocks for converting the lower order bits, as necessary, of said n-bit Gray code number.

6. The method of claim 5, wherein said providing a plurality of building blocks comprises:

providing a 2-bit Gray code conversion circuit including one XOR gate, said conversion circuit for converting a 2-bit Gray code number having a most significant bit (MSB) and a least significant bit (LSB);

outputting said MSB of said 2-bit Gray code number as the binary value of said MSB; and logically XOR'ing said MSB and said LSB of said 2-bit Gray code number, thereby generating the binary value of said LSB.

7. The method of claim 5, wherein said providing a plurality of building blocks comprises:

providing a 3-bit Gray code conversion circuit including two XOR gates, said conversion circuit for converting a 3-bit Gray code number having first, second and third bit, said first bit being most significant and said third bit being least significant;

outputting said fist bit of said 3-bit Gray code number as the binary value of said first bit;

logically XOR'ing said first bit and said second bit of said 3-bit Gray code number, thereby generating a fourth bit being the binary value of said second bit; and logically XOR'ing said fourth bit and said third bit, thereby generating the binary value of said third bit.

8. The method of claim 5, wherein said providing a plurality of building blocks comprises:

providing a 4-bit Gray code conversion circuit including four XOR gates, said 4-bit Gray conversion circuit for converting a 4-bit Gray code number having first, second, third, and fourth bits, said first bit being most significant and said fourth bit being least significant;

outputting said first bit of said Gray code number as the binary value of said first bit;

logically XOR'ing said first bit and said second bit, thereby generating a fifth bit which is the binary value of said second bit;

logically XOR'ing said third bit and said fourth bit, thereby generating a sixth bit;

logically XOR'ing said fifth bit and said third bit, thereby generating the binary value of said third bit; and logically XOR'ing said fifth bit and sixth second bit, thereby generating the binary value of said fourth bit.

9. The method of claim 5, wherein said providing a plurality of building blocks comprises:

providing a 4-bit Gray code conversion circuit including three XOR gates, said 4-bit Gray conversion circuit for converting a 4-bit Gray code number having first, second, third, and fourth bits, said first bit being most significant and said fourth bit being least significant;

outputting said first bit of said Gray code number as the binary value of said first bit;

logically XOR'ing said first bit and said second bit, thereby generating a fifth bit being the binary value of said second bit;

logically XOR'ing said third bit and said fifth bit, thereby generating a sixth bit being the binary value of said third bit; and logically XOR'ing said sixth bit and said fourth bit, thereby generating the binary value of said fourth bit.

10. The method of claim 5, wherein said providing a plurality of building blocks further comprises providing one or more building blocks for converting an 8-bit Gray code number, said building blocks for converting an 8-bit Gray code number having a 3-gate delay or a 4-gate delay.

* * * * *